(12) United States Patent
Siu

(10) Patent No.: US 7,715,409 B2
(45) Date of Patent: May 11, 2010

(54) METHOD AND SYSTEM FOR DATA LINK LAYER ADDRESS CLASSIFICATION

(75) Inventor: Wai-tak Siu, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 610 days.

(21) Appl. No.: 11/089,992

(22) Filed: Mar. 25, 2005

(65) Prior Publication Data

US 2006/0215655 A1    Sep. 28, 2006

(51) Int. Cl.
*H04L 12/28* (2006.01)
(52) U.S. Cl. ............ 370/395.54; 370/351; 370/392
(58) Field of Classification Search ........... 370/351, 370/469, 252, 242, 245, 255, 338, 386, 396, 370/389, 392, 401, 402, 466, 474, 489, 468, 370/395.54; 709/236, 245, 222, 225, 223, 709/250
See application file for complete search history.

(56) References Cited

U.S. PATENT DOCUMENTS

| | | | | |
|---|---|---|---|---|
| 5,581,722 | A * | 12/1996 | Welland | 711/207 |
| 5,708,654 | A * | 1/1998 | Arndt et al. | 370/242 |
| 5,854,901 | A * | 12/1998 | Cole et al. | 709/245 |
| 6,157,644 | A * | 12/2000 | Bernstein et al. | 370/392 |
| 6,256,314 | B1 | 7/2001 | Rodrig et al. | 370/401 |
| 6,405,248 | B1 * | 6/2002 | Wood | 709/223 |
| 6,556,574 | B1 * | 4/2003 | Pearce et al. | 370/401 |
| 6,578,021 | B1 * | 6/2003 | Barillaud | 706/20 |
| 6,636,499 | B1 | 10/2003 | Dowling | |
| 6,639,901 | B1 * | 10/2003 | Katzri et al. | 370/255 |
| 6,674,756 | B1 * | 1/2004 | Rao et al. | 370/395.21 |
| 6,675,206 | B1 * | 1/2004 | Britton et al. | 709/220 |
| 6,847,621 | B1 | 1/2005 | Asahina | |
| 6,856,602 | B1 | 2/2005 | Westberg | |
| 6,868,086 | B1 * | 3/2005 | Putzolu et al. | 370/401 |
| 6,954,459 | B1 * | 10/2005 | Vaidhyanathan et al. | 370/392 |
| 6,985,956 | B2 * | 1/2006 | Luke et al. | 709/229 |
| 7,046,666 | B1 * | 5/2006 | Bollay et al. | 370/392 |

(Continued)

FOREIGN PATENT DOCUMENTS

EP    1076436    2/2001

OTHER PUBLICATIONS

Cisco-Troubleshooting the Catalyst VMPS Switch, sections including Introduction, lead to Troubleshoot DVLAN membership, and Troubleshooting the VMPS Database File, dated at least as early as Oct, 21, 2002 and accessed at http://web.archive.org/web/20021021145728/ht on Feb. 29, 2008 (Cisco Systems, Inc., San Jose, CA).

(Continued)

*Primary Examiner*—Aung S Moe
*Assistant Examiner*—Abdullah Riyami
(74) *Attorney, Agent, or Firm*—Stolowitz Ford Cowger LLP (57) ABSTRACT

A method and system for data link layer address classification. Data link layer address information is received from a device over a local area network (LAN), wherein the LAN is partitioned into a plurality of domains. The data link layer address information is classified as being associated with a domain of the plurality of domains based on a source address of the device. The data link layer address information is assigned to the domain.

25 Claims, 4 Drawing Sheets

U.S. PATENT DOCUMENTS

| | | | |
|---|---|---|---|
| 7,088,689 B2* | 8/2006 | Lee et al. ............... 370/282 |
| 7,088,714 B2* | 8/2006 | Athreya et al. .......... 370/389 |
| 7,120,683 B2* | 10/2006 | Huang .................... 709/223 |
| 7,181,523 B2 | 2/2007 | Sim |
| 7,222,188 B1* | 5/2007 | Ames et al. ............. 709/238 |
| 7,234,163 B1* | 6/2007 | Rayes et al. ............. 726/22 |
| 7,283,534 B1* | 10/2007 | Kelly et al. ......... 370/395.54 |
| 7,283,544 B2* | 10/2007 | Johnson et al. .......... 370/401 |
| 7,327,739 B1* | 2/2008 | Holmgren et al. .... 370/395.54 |
| 7,360,245 B1* | 4/2008 | Ramachandran et al. ... 726/13 |
| 7,478,173 B1* | 1/2009 | Delco ...................... 709/250 |
| 2002/0021689 A1* | 2/2002 | Robbins et al. .......... 370/352 |
| 2002/0027906 A1* | 3/2002 | Athreya et al. .......... 370/386 |
| 2002/0038339 A1 | 3/2002 | Xu |
| 2002/0046271 A1* | 4/2002 | Huang .................... 709/223 |
| 2002/0080800 A1* | 6/2002 | Lee et al. ............. 370/395.54 |
| 2002/0161879 A1* | 10/2002 | Richard .................. 709/223 |
| 2002/0165982 A1* | 11/2002 | Leichter et al. .......... 709/244 |
| 2003/0037163 A1* | 2/2003 | Kitada et al. ............. 709/236 |
| 2003/0043853 A1* | 3/2003 | Doyle et al. ............. 370/489 |
| 2003/0046390 A1* | 3/2003 | Ball et al. ............... 709/224 |
| 2003/0087629 A1 | 5/2003 | Juitt et al. |
| 2003/0103507 A1* | 6/2003 | Lynch et al. ............. 370/392 |
| 2003/0108041 A1* | 6/2003 | Aysan et al. ............. 370/389 |
| 2003/0120759 A1* | 6/2003 | Ogawa .................... 709/221 |
| 2003/0123448 A1* | 7/2003 | Chang ................... 370/395.1 |
| 2003/0154297 A1* | 8/2003 | Suzuki et al. ............ 709/229 |
| 2003/0204632 A1 | 10/2003 | Willebeek-LeMair et al. |
| 2004/0010619 A1* | 1/2004 | Thomas .................... 709/245 |
| 2004/0030804 A1* | 2/2004 | Wiget et al. ............. 709/245 |
| 2004/0066788 A1* | 4/2004 | Lin et al. ................. 370/401 |
| 2004/0133634 A1* | 7/2004 | Luke et al. ............... 709/203 |
| 2004/0215976 A1* | 10/2004 | Jain ......................... 713/201 |
| 2005/0025179 A1 | 2/2005 | McLaggan et al. |
| 2005/0027881 A1* | 2/2005 | Figueira et al. .......... 709/238 |
| 2005/0030955 A1* | 2/2005 | Galin et al. .............. 370/401 |
| 2005/0063398 A1* | 3/2005 | Choudhury et al. ...... 370/401 |
| 2005/0076145 A1* | 4/2005 | Ben-Zvi et al. .......... 709/245 |
| 2005/0105560 A1* | 5/2005 | Mann et al. .............. 370/503 |
| 2005/0114507 A1* | 5/2005 | Tarui et al. ............... 709/224 |
| 2005/0180439 A1* | 8/2005 | Kondo et al. ............. 370/401 |
| 2005/0195813 A1* | 9/2005 | Ambe et al. .............. 370/389 |
| 2005/0198242 A1* | 9/2005 | Kim ........................ 709/223 |
| 2005/0198383 A1* | 9/2005 | Rose et al. ............... 709/245 |
| 2005/0246450 A1* | 11/2005 | Enko et al. ............... 709/230 |
| 2005/0281190 A1* | 12/2005 | McGee et al. ............ 370/216 |
| 2006/0002324 A1* | 1/2006 | Babbar et al. ............. 370/325 |
| 2006/0029097 A1* | 2/2006 | McGee et al. ............ 370/468 |
| 2006/0036765 A1 | 2/2006 | Weyman |
| 2006/0050703 A1 | 3/2006 | Foss |
| 2006/0056315 A1* | 3/2006 | Oman et al. .............. 370/254 |
| 2006/0062187 A1* | 3/2006 | Rune ....................... 370/338 |
| 2006/0090208 A1* | 4/2006 | Smith ....................... 726/26 |
| 2006/0092950 A1* | 5/2006 | Arregoces et al. ........ 370/396 |
| 2006/0107108 A1* | 5/2006 | Geng et al. ................ 714/11 |
| 2006/0164199 A1* | 7/2006 | Gilde et al. ............... 336/234 |
| 2006/0182113 A1* | 8/2006 | Liang et al. ........... 370/395.3 |
| 2006/0206588 A1* | 9/2006 | Saika et al. ............... 709/219 |
| 2007/0192862 A1* | 8/2007 | Vermeulen et al. ......... 726/23 |
| 2007/0192870 A1* | 8/2007 | Lynn et al. ................ 726/26 |
| 2007/0233825 A1* | 10/2007 | Brownell et al. .......... 709/220 |
| 2007/0299942 A1* | 12/2007 | Lu et al. ................... 709/220 |
| 2008/0060073 A1* | 3/2008 | Haeffele et al. ............ 726/23 |
| 2008/0069100 A1* | 3/2008 | Weyman et al. .......... 370/390 |

OTHER PUBLICATIONS

Prosecution History for U.S. Appl. No. 11/141,808, filed May 31, 2005.
Introduction to IP Addressing, Author: Cisco Systems Inc., Published: Jul. 15, 2002 http://web.archive.org/web/20020715180436/internetworkexperts.net/ipaddressing.htm.
Cisco, "GLBP—Gateway Load Balancing Protocol", Cisco IOS Relase 12.2(15)T, Jun. 15, 1999, 42 pages.
Li et al., "RFC 2281 (RFC2281)", Mar. 1998, 17 pages.
www.isi.edu, Joe Touch and Ted Faber, "Dynamic Host Routing for Production Use of Developmental Networks," 14 pages total, www.isi.edu/atomic2/icnp97, Oct. 1997.
www.microsoft.com, "Step-by-Step Guide to a Common Infrastructure for Windows Server 2003 Deployment," 23 pages total, Sep. 17, 2004, www.microsoft.com/technet/prodtechnol/windowsserver2003/technologies/directory/activedicrectory/stepbystep/domcntrl.mspx.

* cited by examiner

METHOD AND SYSTEM FOR DATA LINK LAYER ADDRESS CLASSIFICATION

FIELD OF INVENTION

The present invention relates to the field of network devices. Specifically, the present invention relates to a method and system for data link layer address classification.

BACKGROUND OF THE INVENTION

Until recently, all hosts coupled to a network device over a local area network (LAN) on the same Ethernet were assigned to the same routing domain. For example, in a network device supporting Internet protocol version 4 (IPv4), the network device only had to maintain a single routing information base (RIB), also referred to as a routing table, and a single Address Resolution Protocol (ARP) lookup table.

Recent technological advances in the field of data routing has provided applications where hosts coupled to a network device over a LAN on the same Ethernet can be partitioned into different domains. In other words, the LAN can be logically partitioned into a number of domains based on the IP address. The domains may also be referred to as virtual private network (VPN) routing/forwarding (VRFs). In order to support the proper routing of packets in this configuration, the network device maintains a separate routing table for each domain.

In order for devices coupled to a LAN to communicate with the network device, a mapping between the LAN (e.g., data link layer) and the network device (e.g., the network layer) is required. An ARP lookup table provides this mapping. However, where the LAN is logically partitioned into multiple domains, ARP packets are currently assigned to a default domain of the network device. The default domain may not accurately reflect which domain the ARP information should belong to. Accordingly, a need exists for a method and/or system for assigning the ARP information to the proper domain in a LAN logically partitioned into multiple domains.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

Various embodiments of the present invention, a method and system for data link layer address classification, are described herein. Embodiments of the present invention provide for receiving data link layer address information from a device over a local area network (LAN), wherein the LAN is partitioned into a plurality of domains. In one embodiment, the data link layer address information is Address Resolution Protocol (ARP) information. The data link layer address information is classified as being associated with a domain of the plurality of domains based on a source address of the device. In one embodiment, the source address is an Internet protocol (IP) address. The data link layer address information is assigned to the domain.

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here and generally conceived to be a self-consistent sequence of steps of instructions leading to a desired result. The steps are those requiring physical manipulations of data representing physical quantities to achieve tangible and useful results. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving", "classifying", "assigning", "storing", "determining", "transmitting", "executing", or the like, refer to the actions and processes of a computer system or similar electronic computing device (e.g., a network device). The computer system or similar electronic device manipulates and transforms data represented as electronic quantities within the computer system's registers and memories into other data similarly represented as physical quantities within the computer system memories into other data similarly represented as physical quantities within the computer system memories or registers or other such information storage, transmission, or display devices.

Figure 1:
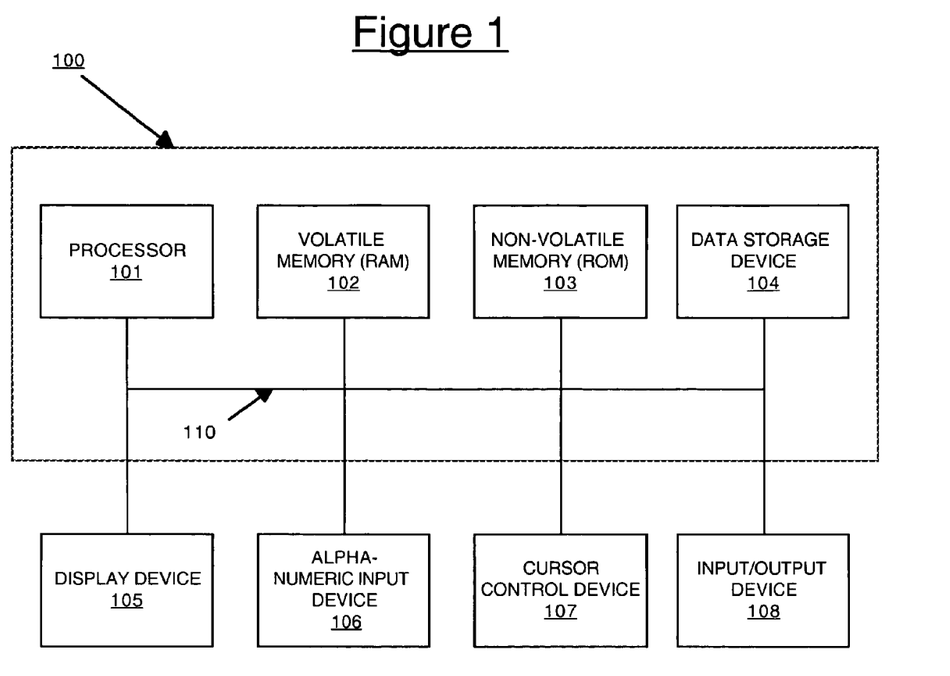
FIG. 1 is a block diagram of an exemplary computer system platform upon which embodiments of the present invention may be practiced.

Refer now to FIG. 1 that illustrates an exemplary computer system 100 upon which embodiments of the present invention may be practiced. In one embodiment, computer system 100 is a network device (e.g., network device 230 of FIG. 2), such as a router. In general, computer system 100 comprises bus 110 for communicating information, processor 101 coupled with bus 110 for processing information and instructions, random access (volatile) memory (RAM) 102 coupled with bus 110 for storing information and instructions for processor

101, read-only (non-volatile) memory (ROM) 103 coupled with bus 110 for storing static information and instructions for processor 101, data storage device 104 such as a magnetic or optical disk and disk drive coupled with bus 110 for storing information and instructions.

In one embodiment, computer system 100 comprises an optional user output device such as display device 105 coupled to bus 110 for displaying information to the computer user, an optional user input device such as alphanumeric input device 106 including alphanumeric and function keys coupled to bus 110 for communicating information and command selections to processor 101, and an optional user input device such as cursor control device 107 coupled to bus 110 for communicating user input information and command selections to processor 101. Furthermore, an optional input/output (I/O) device 108 is used to couple computer system 100 onto, for example, a network.

Display device 105 utilized with computer system 100 may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

Figure 2:
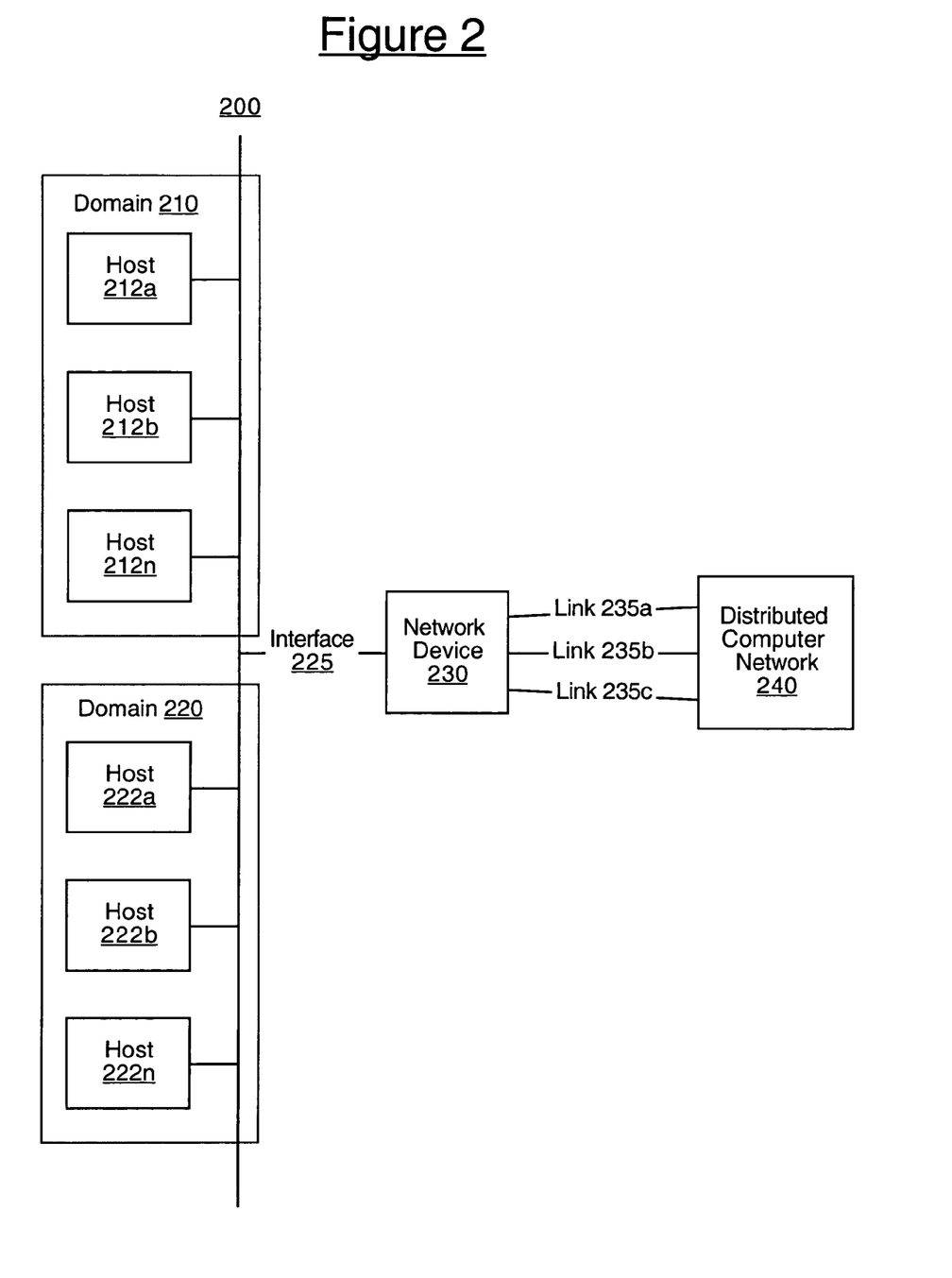
FIG. 2 is a block diagram of one embodiment of a local area network (LAN) upon which embodiments of the present invention may be practiced.

FIG. 2 is a block diagram of one embodiment of a local area network (LAN) 200 upon which embodiments of the present invention may be practiced. LAN 200 includes network device 230 communicatively coupled to a plurality of hosts 212*a*, 212*b*, 212*n*, 222*a*, 222*b* and 222*n* over interface 225. In one embodiment, network device 230 is a router. It should be appreciated that the hosts may include any type of computing device, including but not limited to: desktop computer systems, laptop computer systems, personal digital assistants, cellular telephones, and the like.

Network device 230 is operable to be logically partitioned into a plurality of domains. The domains may also be referred to as virtual private network (VPN) routing/forwarding (VRFs) herein. As shown, network device 230 is partitioned into two domains 210 and 220. Domain 210 includes hosts 212*a*, 212*b* and 212*n*. Domain 220 includes hosts 222*a*, 222*b* and 222*n*. It should be appreciated that network device 230 may be partitioned into any number of domains and that a domain may include any number of hosts, and that the present invention is not limited to the shown embodiment. In one embodiment, each domain of the plurality of domains is associated with a different IP subnet of the LAN.

Referring still to FIG. 2, LAN 200 includes well-known network technologies. For example, LAN 200 can be implemented using Ethernet, Fiber Distributed Data Interface (FDDI), or other wired or wireless network technologies. Network device 230 is coupled to distributed computer network 240 over at least one communication link 235. It should be appreciated that network device 230 may be coupled to distributed computer network 240 over any number of communication links (e.g., communication links 235*a*, 235*b* and 235*c*). Communications links 235*a*, 235*b* and 235*c* may be implemented using, for example, a telephone circuit, communications cable, optical cable, wireless link, or the like. It should be appreciated that distributed computer network 240 may be any type of network, including but not limited to: an intranet, the Internet, or the like.

As described above, LAN 200 is partitioned into a plurality of domains (VRFs) 210 and 220. Since incoming packets received over interface 225 may not be assigned to the default domain associated with interface 225, it is necessary to provide a mechanism for classifying data link layer information, according to a domain of the plurality of domains. It should be appreciated that the data link layer refers to layer 2 of the OSI protocol stack. In one embodiment, the data link layer information is a media access control (MAC) address. The following embodiments of the present invention are described according to the IP version 4 (IPv4) standard, where the data link layer information is Address Resolution Protocol (ARP) information transmitted in an ARP packet. However, it should be appreciated that embodiments of the present invention may be implemented using other standards where the data link layer information provides a mapping between the data link layer and the network layer. For example, other standards upon which embodiments of the present invention may be implemented include, but are not limited to: IPv6, as well as proprietary routing protocols.

Connected routes of interface 225 can be associated with an alternative domain which is different to the domain of interface 225. When this association is made, it triggers the building of a lookup table for ARP information for the domain. In this lookup table, each entry provides the mapping from the source information of the packet into a domain. During a database search, either an IPv4 network/subnet or an IPv4 address in place of the IPv4 prefix are received. When an ARP packet is received on interface 225, the source (e.g., a host), which is identified by an IPv4 address, is used together with the ingress for a search of the lookup table. If the search is successful, it yields a domain, and the ARP address is assigned to the domain. The ARP information learned from this packet is hence assigned to that domain, and stored in the ARP lookup table for that domain. Alternatively, if the search fails, the ARP information is stored in the ARP lookup table of the default domain associated with the interface.

Figure 3:
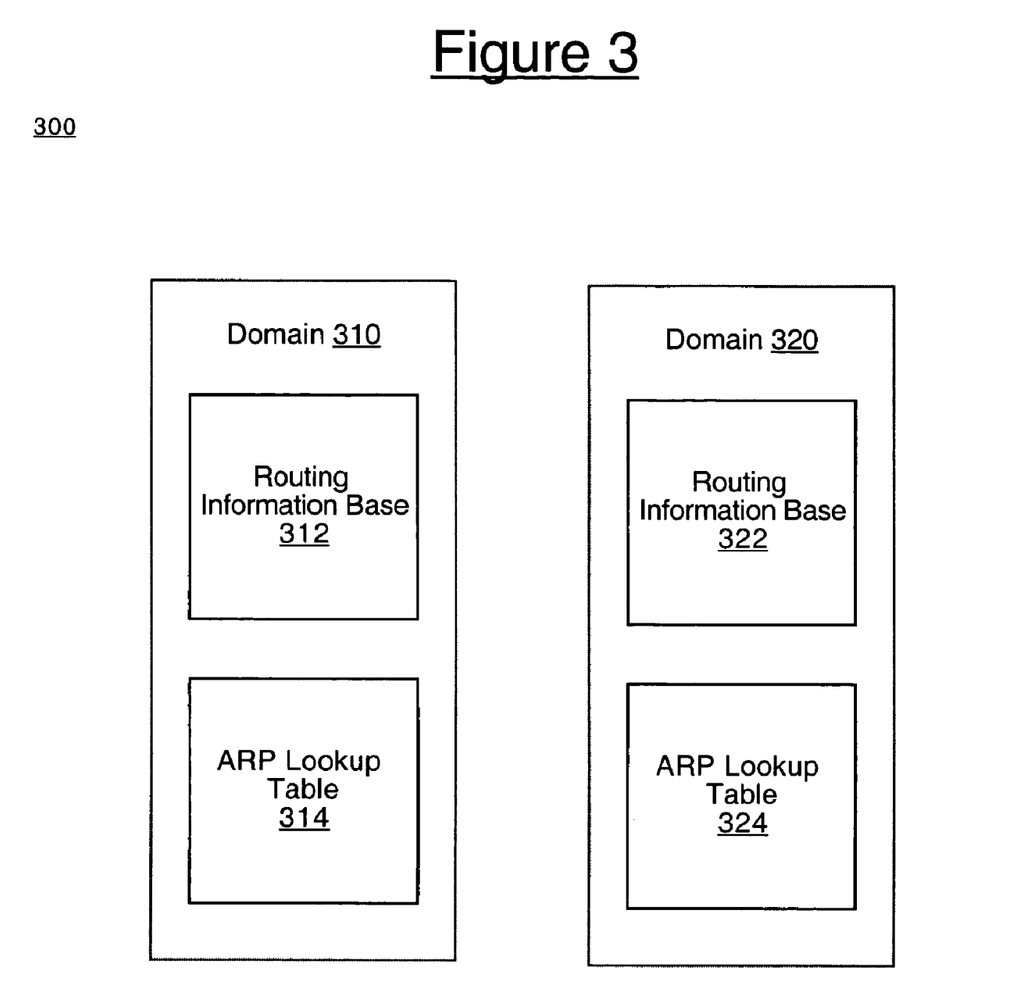
FIG. 3 is a block diagram illustrating an exemplary routing data structure of a network device, in accordance with one embodiment of the present invention.

FIG. 3 is a block diagram illustrating an exemplary routing data structure 300 of a network device (e.g., network device 230 of FIG. 2), in accordance with one embodiment of the present invention. As described above, the network device of the present invention is operable to be logically partitioned into a plurality of domains. These domains are shown in FIG. 3 as domains 310 and 320. Each domain has an associated routing information base (RIB), e.g., RIB 312 and RIB 322, that includes the information for routing packets. Moreover, each domain also has an associated ARP lookup table, e.g., ARP lookup table 314 and ARP lookup table 324.

An ARP lookup table provides a mapping between the addressable devices of a LAN and the network layer, such that packets for transmission to a particular device are received at the intended device. Since the network device of the present invention may be logically partitioned into different domains, it is necessary to maintain separate ARP lookup tables for each domain. It should be appreciated that the ARP lookup tables of the described invention may be maintained with one physical table. However, in order to provide efficient and easily manageable ARP classification, the ARP lookup tables are logically separate according to domain. By logically separating the ARP lookup tables according to domain, the present invention avoids the duplication of data and is easier to dynamically update.

Figure 4:
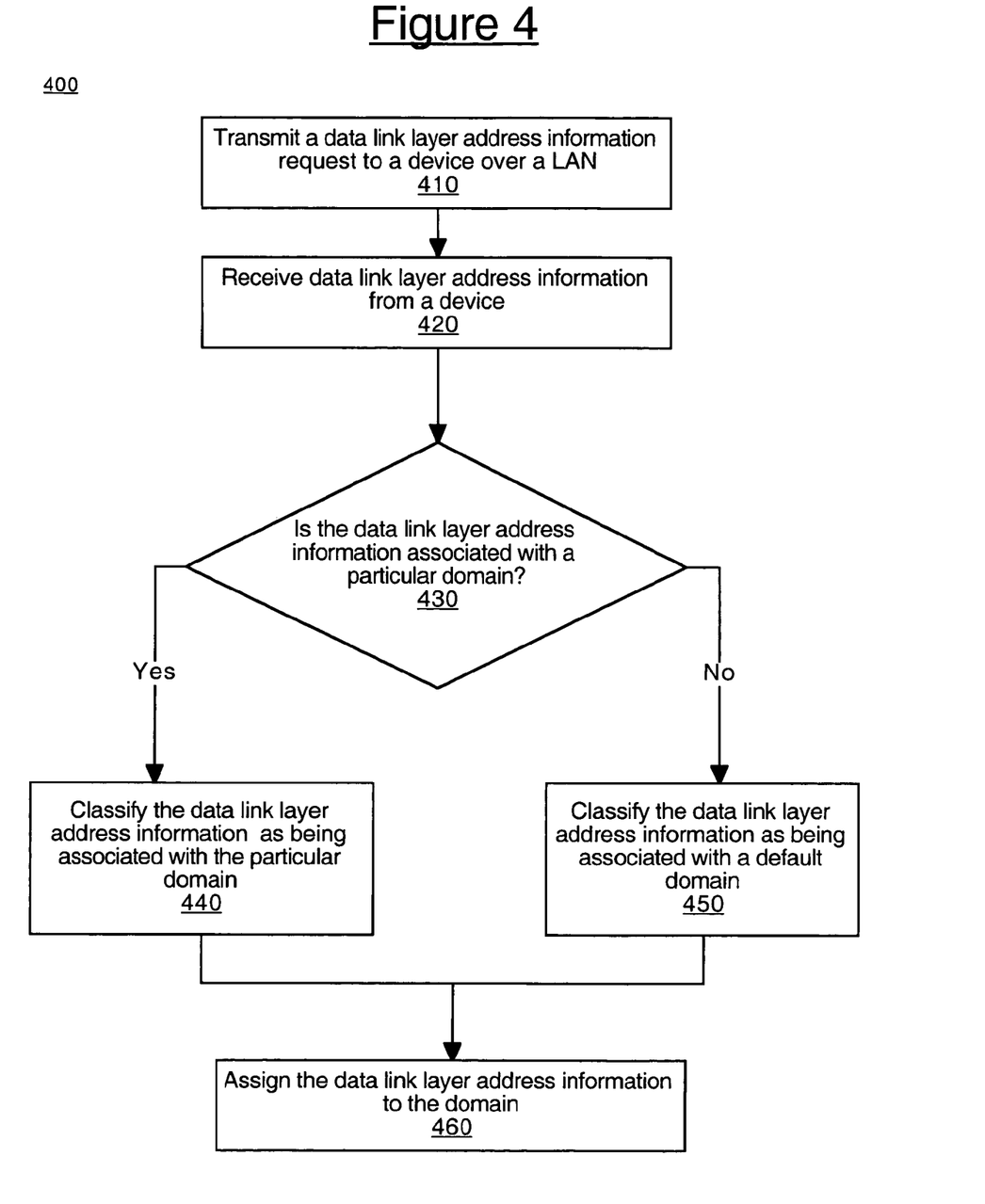
FIG. 4 is a flow chart illustrating a method for data link layer address classification, in accordance with one embodiment of the present invention.

FIG. 4 is a flow chart illustrating a method 400 for data link layer address classification, in accordance with one embodiment of the present invention. In one embodiment, process 400 is carried out by processors and electrical components under the control of computer readable and computer executable instructions. The computer readable and computer executable instructions reside, for example, in data storage features such as computer usable volatile and non-volatile memory (e.g., volatile memory 102 and non-volatile memory 103 of FIG. 1). However, the computer readable and computer executable instructions may reside in any type of computer readable medium. Although specific steps are disclosed in process 400, such steps are exemplary. That is, the embodiments of the present invention are well suited to performing various other steps or variations of the steps recited in FIG. 4. In one embodiment, process 400 is performed by network device 230 of FIG. 2.

At step 410 of method 400, a data link layer address information request is transmitted to a device (e.g., a host) over a LAN. The LAN is logically partitioned into a plurality of domains. In one embodiment, the request is transmitted to learn the data link address of the device. In another embodiment, the request is transmitted periodically to refresh the ARP information. In one embodiment, a link layer address information request is an ARP information request transmitted in an ARP packet. It should be appreciated that step 410 is optional.

At step 420, data link layer address information is received from the device over the LAN and includes a source address of the device. In one embodiment, the data link layer address information is comprised within an ARP packet. In one embodiment, the ARP packet is sent in response to the request as described at step 410. In another embodiment, the ARP packet is sent gratuitously. In one embodiment, each domain of the plurality of domains is associated with a different IP subnet of the LAN.

At step 430, it is determined whether the source address is associated with a domain of the plurality of domains. If the source address is associated with a particular domain of the plurality of domains, as shown at step 440, the data link layer address information is classified as being associated with the particular domain. Alternatively, if the source address is not associated with a domain of the plurality of domains, as shown at step 450, the data link layer address information is classified as being associated with a default domain of the plurality of domains.

At step 460, the data link layer address information is assigned to the appropriate domain. In one embodiment, the data link layer address information is stored in a data link layer address lookup table associated with the domain (e.g., ARP lookup table 314 of FIG. 3).

The described embodiments of the present invention provide a system and method for data link layer address classification (e.g., ARP classification). By assigning the data link layer address information to the correct domain, the described embodiments provide for efficient data link layer address lookup. Moreover, since the data link layer address information is stored according to domain, there is no need to duplicate information across all domains. The described embodiments describe a method and system for classifying data link layer information according to domains in a network device supporting multiple domains on a single LAN.

Various embodiments of the present invention, a system and method for data link layer address classification, are thus described. While the present invention has been described in particular embodiments, it should be appreciated that the present invention should not be construed as limited by such embodiments, but rather construed according to the below claims.

What is claimed is:

1. A method, comprising:

mapping, on a gateway that is communicatively coupled to a physical Local Area Network (LAN) using one or more network interfaces, network addresses of a plurality of network devices operating in the physical LAN to a plurality of different logical domains of the same physical LAN;

after performing said mapping, receiving an Address Resolution Protocol (ARP) packet over a particular one of the one or more network interfaces;

associating the received ARP packet with an entry in the mapping by extracting information from a source Internet Protocol (IP) address field of the ARP packet and comparing the extracted information together with an identifier for the particular one of the network interfaces to the mapping, wherein the extracted information is limited to information included in the source IP address field of the ARP packet and the association is made using no other information from the received ARP packet other than the information included in the source IP address field of the ARP packet, and wherein said association allows the gateway to perform a logical domain classification for the ARP packet independently of whether the network devices are configured to mark ARP packets according to the partitioning of the physical LAN into the plurality of logical domains;

providing a plurality of separate ARP tables that are each associated with a different one of the logical domains; and selecting one of the ARP tables to be updated according to the received ARP packet, wherein the ARP table is selected according to the association, and updating the selected ARP table according to the ARP packet.

2. The method as recited in claim 1 wherein said association allows the gateway to perform a logical domain classification for the ARP packet independently of whether the network devices are configured to tag ARP messages according to the logical domain partitioning.

3. The method as recited in claim 1 further comprising dynamically generating the ARP tables as ARP messages are received.

4. The method as recited in claim 1 further comprising:

determining whether the source IP address of the ARP packet is associated with a subnet of said plurality of logical domains; and provided said source address is not associated with the subnet of said plurality of logical domains, updating one of the ARP tables that corresponds to a default subnet of said plurality of logical domains.

5. The method as recited in claim 1 further comprising broadcasting a data link layer address information request to each of said network devices over said physical LAN.

6. The method as recited in claim 5 wherein said broadcasting is executed to learn the data link address of each of said network devices.

7. The method as recited in claim 5 wherein said broadcasting said data link layer address information request is executed periodically.

8. The method as recited in claim 1 wherein each logical domain is selectively associated with a different IP subnet of said physical (LAN), and wherein the association is made by applying a subnet mask to the extracted source IP address.

9. A network forwarding device comprising:
- a bus;
- a first interface coupled externally to a broadcast domain formed by local devices of a physical Local Area Network (LAN) partitioned into a plurality of logical domains;
- a second interface coupled externally to a distributed computer network; and
- a computer-readable memory coupled to said bus and encoded with instructions that, if executed, result in:
- mapping network addresses of said local devices to the plurality of logical domains;
- after performing said mapping, receiving, at said first interface of said forwarding device, data link layer address information from said broadcast domain formed by said local devices of said physical LAN;
- classifying said data link layer address information of a first one and a second one of said local devices as being associated with a first one and a second one of said plurality of logical domains, respectively, by comparing all or part of source Internet Protocol (IP) addresses included in the data link layer address information together with an identifier for the first interface to the mapping; and
- storing said data link layer address information of said first one and said second one of said local devices in separate data link layer address lookup tables each associated with a corresponding one of said first one and said second one of said logical domains, said storing conducted according to said classification.

10. The network forwarding device as recited in claim 9 wherein said data link layer address information is comprised within an Address Resolution Protocol (ARP) packet, and wherein said data link layer address information maps a data link layer address and a network layer address.

11. The network forwarding device as recited in claim 9 wherein said data link layer address information is ARP information.

12. The network forwarding device as recited in claim 9 wherein said instructions result in dynamically generating the data link layer address lookup tables as ARP packets are received.

13. The network forwarding device as recited in claim 9 wherein said classifying said data link layer address information comprises:
- determining whether said source IP addresses are associated with a subnet of said plurality of logical domains; and
- provided said source IP addresses are not associated with the subnet of said plurality of logical domains, classifying said data link layer address information as being associated with a default subnet of said plurality of logical domains.

14. The network forwarding device as recited in claim 9 wherein said instructions result in transmitting at said first interface a data link layer address information request to each of said local devices over said physical LAN.

15. The network forwarding device as recited in claim 9 wherein each of said plurality of logical domains is selectively associated with a different IP subnet of said LAN.

16. A gateway, comprising:
- means for mapping network addresses of a plurality of network devices operating in a same physical Local Area Network (LAN) to a plurality of different logical domains of the same physical LAN;
- means for associating a received Address Resolution Protocol (ARP) packet with an entry in the mapping by extracting information from a source Internet Protocol (IP) address field of the ARP packet and comparing the extracted information together with an identification of an ingress interface associated with the received ARP packet to the mapping, wherein said association according to the information from the source IP address field and the ingress interface identification allows the gateway to perform a logical domain classification for the ARP packet independently of whether information of the logical domain partitioning is fed back to the network devices;
- means for providing a plurality of separate ARP tables associated with the logical domains; and
- means for selecting one of the ARP tables to be updated according to the received ARP packet, wherein the ARP table is selected according to the association, and updating the selected ARP table according to the ARP packet.

17. The gateway as recited in claim 16, further comprising:
- means for determining whether said information is associated with a subnet of said plurality of logical domains; and
- means for classifying said information as being associated with a default subnet of said plurality of logical domains provided the source IP address is not associated with the subnet of said plurality of logical domains.

18. The gateway as recited in claim 16 further comprising means for transmitting a data link layer address information request to each of said network devices over said LAN.

19. A method for data link layer address classification, said method comprising:
- providing a forwarding device including a local interface and a plurality of network interfaces;
- receiving, at said local interface of said forwarding device, data link layer address information from a broadcast domain formed by local devices over a local area network (LAN), wherein said LAN is partitioned into a plurality of logical domains;
- classifying said data link layer address information of a first one and a second one of said local devices as being associated with a first one and a second one of said plurality of logical domains, respectively, based on information corresponding to the local interface together with a network layer source address of said first one and said second one of said local devices, respectively, using a processor of said forwarding device coupled to said local interface, said classifying including storing said data link layer address information of said first one and said second one of said local devices in separate data link layer address lookup tables each associated with a corresponding one of said first one and said second one of said logical domains; and
- dynamically assigning said data link layer address information of said first one and said second one of said local devices to update said logical domains including providing a separate mapping for each respective domain between a data link layer address included in said data link layer address information and said network layer source address for each local device classified under said respective domain such that a respective local device classified under a particular one of said logical domains is selectively assignable to a different one of said logical domains independently of any fixed network topology in which said forwarding device operates.

20. The method of claim 19 further including providing for each respective domain a routing table such that each local device is selectively able to exchange data with any network destination accessible through a selected one of the plurality of network interfaces.

21. The method of claim 20 including selectively assigning one of said local devices to one of said logical domains for which said routing table designates said selected one of said plurality of network interfaces.

22. The method of claim 21 including selectively re-assigning said respective local device as classified under said particular one of said logical domains to a different one of said logical domains solely by identifying a different network layer source address for said respective local device.

23. The method of claim 22 including selectively assigning said respective local device as classified under said particular one of said logical domains to said different one of said logical domains free of any retagging of packets from said respective local device.

24. The method of claim 19 wherein said dynamically assigning includes identifying only one network layer source address for said respective local device at any given time.

25. The method of claim 1 wherein the mapping selectively partitions the physical LAN into an arbitrary number of logical domains, the arbitrary number selected independently of an amount of the network interfaces coupling the gateway to the physical LAN.

* * * * *

UNITED STATES PATENT AND TRADEMARK OFFICE
CERTIFICATE OF CORRECTION

| | | |
|---|---|---|
| PATENT NO. | : 7,715,409 B2 | Page 1 of 1 |
| APPLICATION NO. | : 11/089992 | |
| DATED | : May 11, 2010 | |
| INVENTOR(S) | : Siu | |

It is certified that error appears in the above-identified patent and that said Letters Patent is hereby corrected as shown below:

At column 6, line 66, please replace "(LAN)" with --LAN--.

Signed and Sealed this
Twenty-sixth Day of July, 2011

David J. Kappos
*Director of the United States Patent and Trademark Office*